(12) United States Patent
Kubo

(10) Patent No.: US 11,535,067 B2
(45) Date of Patent: *Dec. 27, 2022

(54) PNEUMATIC TIRE

(71) Applicant: TOYO TIRE & RUBBER CO., LTD., Itami (JP)

(72) Inventor: Haruka Kubo, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 447 days.

This patent is subject to a terminal disclaimer.

(21) Appl. No.: 16/215,740

(22) Filed: Dec. 11, 2018

(65) Prior Publication Data

US 2019/0193484 A1    Jun. 27, 2019

(30) Foreign Application Priority Data

Dec. 22, 2017 (JP) .............................. JP2017-245824
Dec. 22, 2017 (JP) .............................. JP2017-245825
Dec. 22, 2017 (JP) .............................. JP2017-245826

(51) Int. Cl.
  *B60C 15/06*    (2006.01)
  *B60C 1/00*    (2006.01)
  (Continued)

(52) U.S. Cl.
  CPC ............ *B60C 15/06* (2013.01); *B60C 9/1835* (2013.01); *B60C 15/0628* (2013.01);
  (Continued)

(58) Field of Classification Search
  CPC ................ B60C 15/0635; B60C 15/06; B60C 2015/0614; B60C 2015/0617;
  (Continued)

(56) References Cited

U.S. PATENT DOCUMENTS 5,885,388 A    3/1999    Ueyoko et al.
11,318,797 B2    5/2022    Nagai
(Continued)

FOREIGN PATENT DOCUMENTS

CN    1826239 A    8/2006
CN    1876701 A    12/2006
(Continued)

OTHER PUBLICATIONS

Office Action dated Sep. 30, 2020, issued in counterpart CN Application No. 201811497149.X, with English Translation. (17 pages).

(Continued)

*Primary Examiner* — Adrienne C. Johnstone
(74) *Attorney, Agent, or Firm* — WHDA, LLP

(57) ABSTRACT

A pneumatic tire includes: a bead core; a bead filler; a carcass ply; a side wall rubber that is arranged on the tire-outer-surface-side of the carcass ply and constitutes a tire outer surface; a chafer layer that is turned from the tire-inner-surface-side to the tire-outer-surface-side around the bead core and the bead filler and rolled up on an outer surface of the carcass ply; a pair of a tape rubber and a rear pad rubber that are located between the side wall rubber and the carcass ply and arranged so as to hold a rolled-up end of the chafer layer from both sides in a tire width direction; and a tread rubber, in which modulus values of the pair of the tape rubber and the rear pad rubber are higher than a modulus value of the side wall rubber, and the tread rubber contains silica.

11 Claims, 3 Drawing Sheets

(51) Int. Cl.
*B60C 13/00* (2006.01)
*B60C 9/18* (2006.01)

(52) U.S. Cl.
CPC .... *B60C 15/0635* (2013.01); *B60C 2001/005* (2013.01); *B60C 2013/006* (2013.01); *B60C 2015/0614* (2013.01); *B60C 2015/0617* (2013.01); *B60C 2015/0621* (2013.01); *B60C 2015/0625* (2013.01)

(58) Field of Classification Search
CPC .... B60C 2015/0621; B60C 2015/0625; B60C 15/0628
See application file for complete search history.

(56) References Cited

U.S. PATENT DOCUMENTS

| | | | |
|---|---|---|---|
| 11,331,961 | B2 | 5/2022 | Yamamoto |
| 2006/0272757 | A1 | 12/2006 | Mizuno |
| 2007/0151649 | A1 | 7/2007 | Numata |
| 2007/0175561 | A1 | 8/2007 | Daghini et al. |
| 2008/0035261 | A1 | 2/2008 | Maruoka |
| 2008/0093001 | A1 | 4/2008 | Ono |
| 2009/0114332 | A1 | 5/2009 | Daghini et al. |
| 2012/0073723 | A1 | 3/2012 | Daval |
| 2012/0186717 | A1 | 7/2012 | Kodama |
| 2013/0037196 | A1 | 2/2013 | Kodama |
| 2013/0133806 | A1 | 5/2013 | Amano et al. |
| 2013/0303657 | A1 | 11/2013 | Miyazaki |
| 2014/0011939 | A1 | 1/2014 | Iizuka et al. |
| 2015/0083297 | A1 | 3/2015 | Inata et al. |
| 2015/0144242 | A1 | 5/2015 | Lagarde, Jr. et al. |
| 2016/0114633 | A1 | 4/2016 | Miyasaka |
| 2017/0355830 | A1 | 12/2017 | Haba et al. |
| 2019/0193485 | A1 | 6/2019 | Nagai |

FOREIGN PATENT DOCUMENTS

| | | | |
|---|---|---|---|
| CN | 1990277 | A | 7/2007 |
| CN | 101072693 | A | 11/2007 |
| CN | 101121370 | A | 2/2008 |
| CN | 102616091 | A | 8/2012 |
| CN | 103476852 | A | 12/2013 |
| CN | 104002618 | A | 8/2014 |
| CN | 104395112 | A | 3/2015 |
| CN | 104395378 | A | 3/2015 |
| CN | 105539019 | A | 5/2016 |
| EP | 72956 | A2 | 3/1983 |
| EP | 2662405 | B1 | 12/2014 |
| JP | S63-83148 | A | 4/1988 |
| JP | H06-191240 | A | 7/1994 |
| JP | H08-156533 | A | 6/1996 |
| JP | H09-099710 | A | 4/1997 |
| JP | H09-99715 | A | 4/1997 |
| JP | H09-315112 | A | 12/1997 |
| JP | H11-227409 | A | 8/1999 |
| JP | 2000-301919 | A | 10/2000 |
| JP | 2002-178724 | A | 6/2002 |
| JP | 2005-112042 | A | 4/2005 |
| JP | 2008-69207 | A | 3/2008 |
| JP | 2009-101943 | A | 5/2009 |
| JP | 2009-292310 | A | 12/2009 |
| JP | 2012-025296 | A | 2/2012 |
| JP | 5442762 | B2 | 3/2014 |
| JP | 5944826 | B2 | 7/2016 |
| JP | 2017-222764 | A | 12/2017 |

OTHER PUBLICATIONS

Office Action dated Jan. 24, 2019, issued in counterpart DE Application No. 102018131338.1, with English translation. (counterpart to U.S. Appl. No. 16/215,863) (7 pages).
Office Action dated Jul. 30, 2020, issued in counterpart CN Application No. 201811497975.4, with English Translation. (counterpart to U.S. Appl. No. 16/215,863) (18 pages).
Office Action dated Oct. 19, 2020, issued in CN Application No. 201811495881.3, with English Translation. (counterpart to U.S. Appl. No. 16/215,764) (15 pages).
Office Action dated Sep. 30, 2020, issued in CN Application No. 201811496834.0, with English Translation. (counterpart to U.S. Appl. No. 16/215,784)(13 pages).
Office Action dated Sep. 14, 2020, issued in CN Application No. 201811498133.0, with English translation (counterpart to U.S. Appl. No. 16/215,728) (12 pages).
Non-Final Office Action dated Apr. 6, 2021, issued in U.S. Appl. No. 16/215,764 (18 pages).
Non-Final Office Action dated May 27, 2021, issued in U.S. Appl. No. 16/215,784 (16 pages).
Non-Final Office Action dated Mar. 18, 2021, issued in U.S. Appl. No. 16/215,728 (19 pages).
Office Action dated Apr. 26, 2021, issued in CN Application No. 201811498133.0, with English Translation. (counterpart to U.S. Appl. No. 16/215,728)(16 pages).
Non-Final Office Action dated May 26, 2022, issued in U.S. Appl. No. 16/215,863 (15 pages).
Office Action dated Nov. 2, 2021, issued in JP application No. 2017-245827 (counterpart to U.S. Appl. No. 16/215,863), with English translation. (12 pages).
Office Action dated Nov. 2, 2021, issued in JP application No. 2017-245828 (counterpart to U.S. Appl. No. 16/215,863), with English translation. (13 pages).
Office Action dated Oct. 13, 2021, issued in CN Application No. 201811497975.4 (counterpart to U.S. Appl. No. 16/215,863), with English translation. (14 pages).
Office Action dated Nov. 2, 2021, issued in counterpart JP application No. 2017-245824, with English translation. (10 pages).
Office Action dated Nov. 2, 2021, issued in counterpart JP application No. 2017-245825, with English translation. (13 pages).
Office Action dated Nov. 2, 2021, issued in counterpart JP application No. 2017-245826, with English translation. (11 pages).
Office Action dated Nov. 3, 2021, issued in counterpart CN application No. 201811497149.X, with English translation. (15 pages).
Chinese Office Action with English translation dated Mar. 24, 2021, issued in counterpart CN Application No. 201811497975.4 (counterpart to U.S. Appl. No. 16/215,863).(5 pages).
Chinese Office Action with English translation dated Jun. 4, 2021, issued in CN Application No. 201811497149.X. (7 pages).
Office Action dated Feb. 8, 2022, issued counterpart in JP application No. 2017-245824, with English translation. (8 pages).
Office Action dated Feb. 8, 2022, issued in counterpart JP application No. 2017-245825, with English translation. (10 pages).
Office Action dated Feb. 8, 2022, issued in counterpart JP application No. 2017-245826, with English translation. (14 pages).
Office Action dated Feb. 8, 2022, issued in JP application No. 2017-245827 (counterpart to U.S. Appl. No. 16/215,863), with English translation. (9 pages).
Office Action dated Feb. 8, 2022, issued in JP application No. 2017-245828 (counterpart to U.S. Appl. No. 16/215,863), with English translation. (10 pages).
Office Action dated Aug. 31, 2021, issued in JP Application No. 2017-245823, with English translation. (counterpart to U.S. Appl. No. 16/215,728) (8 pages).
Office Action dated Aug. 31, 2021, issued in JP Application No. 2017-245822, with English translation. (counterpart to U.S. Appl. No. 16/215,784) (7 pages).
Office Action dated Aug. 31, 2021, issued in JP Application No. 2017-245821, with English translation. (counterpart to U.S. Appl. No. 16/215,764) (6 pages).

PNEUMATIC TIRE

CROSS-REFERENCE TO RELATED APPLICATIONS

This application is based upon and claims the benefit of priority from Japanese Patent Application No. 2017-245824, Japanese Patent Application No. 2017-245825, and Japanese Patent Application No. 2017-245826 filed with the Japan Patent Office on Dec. 22, 2017, the entire contents of which are incorporated herein by reference.

TECHNICAL FIELD

The present invention relates to a pneumatic tire.

More specifically, a first aspect of the present invention relates to a pneumatic tire that is excellent in durability and rolling-resistance; the pneumatic tire includes a pair of support rubbers arranged so as to hold a rolled-up end of a chafer layer from both sides in a tire width direction, and a tread rubber contains silica.

Furthermore, a second aspect of the present invention relates to a pneumatic tire that is low-heat-generating, low in rolling resistance, and excellent in durability; the pneumatic tire includes a pair of support rubbers (a tape rubber and a rear pad rubber) arranged so as to hold a rolled-up end of a chafer layer from both sides in a tire width direction, and a tread rubber contains silica, and the rear pad rubber contains silica.

Moreover, a third aspect of the present invention relates to a pneumatic tire that is low-heat-generating and excellent in durability and rolling resistance; the pneumatic tire includes a pair of support rubbers arranged so as to hold a rolled-up end of a chafer layer from both sides in a tire width direction, and a tread rubber contains silica, and a rear pad rubber contains a Resorcin-containing formaldehyde condensate.

Unless otherwise specially specified, this specification describes all of the first to third aspects.

BACKGROUND OF THE INVENTION

There is known a pneumatic tire with a pad rubber in a bead part. For example, Japanese Patent No. 5442762 and Japanese Patent No. 5944826 disclose a pneumatic tire in which a pad rubber is arranged on the tire-outer-surface-side of a carcass ply so as to correspond to the outside of a bead filler in a tire width direction. The pad rubber suppresses the concentration of distortion near an outer-diameter-side end of the bead filler caused by a load input from a rim flange and/or deformation of a side wall part, etc., when rolling under a load and therefore, separation of the carcass ply rolled up thereon is suppressed.

The pad rubber according to Japanese Patent No. 5442762 is arranged over the tire-inner-surface-side of a rim strip rubber and a side wall rubber adjacent to the outer-diameter-side of the rim strip rubber in a tire radial direction. The pad rubber according to Japanese Patent No. 5944826 is arranged on the tire-inner-surface-side of the rim strip rubber.

SUMMARY OF THE INVENTION

In the pneumatic tire according to Japanese Patent No. 5944826, a chafer layer rolled up from the tire-inner-surface-side to the tire-outer-surface-side is provided around a bead part. In this case, when rolling under a load, the distortion is likely to be concentrated also on a rolled-up end of the chafer layer around the bead part. However, in the pneumatic tire according to Japanese Patent No. 5944826, the pad rubber is arranged on the outside in the tire radial direction further than the chafer layer, thus does not effectively contribute to suppression of the concentration of distortion at the rolled-up end of the chafer layer.

An object of the first aspect of the present invention is to provide a pneumatic tire including the chafer layer in the bead part, which is capable of suppressing the concentration of distortion at the rolled-up end of the chafer layer to improve the durability while decreasing the rolling resistance of the tire.

Moreover, an object of the second aspect of the present invention is to provide a pneumatic tire including the chafer layer in the bead part and capable of suppressing the concentration of distortion at the rolled-up end of the chafer layer, to suppress the generation of heat, decrease the rolling resistance, and improve the durability.

Furthermore, an object of the third aspect of the present invention is to provide a pneumatic tire including the chafer layer in the bead part and capable of suppressing the concentration of distortion at the rolled-up end of the chafer layer, to suppress the generation of heat, decrease the rolling resistance, and improve the durability.

In the first aspect of the present invention, there is provided a pneumatic tire comprising: a pair of bead cores; a pair of bead fillers that are connected to the pair of bead cores and extend to an outer-diameter-side in a tire radial direction; a carcass ply that is suspended between the pair of bead cores; a side wall rubber that is arranged on a tire-outer-surface-side of the carcass ply and constitutes a tire outer surface; a chafer layer that is turned from a tire-inner-surface-side to the tire-outer-surface-side around the bead cores and the bead fillers and rolled up on an outer surface of the carcass ply; a pair of support rubbers that are located between the side wall rubber and the carcass ply and arranged so as to hold a rolled-up end of the chafer layer from both sides in a tire width direction; and a tread rubber, wherein modulus values of the pair of support rubbers are higher than a modulus value of the side wall rubber, and the tread rubber contains silica.

Moreover, in the second aspect of the present invention, there is provided a pneumatic tire including: a pair of bead cores; a pair of bead fillers that are connected to the pair of bead cores and extend to the outer-diameter-side in a tire radial direction; a carcass ply that is suspended between the pair of bead cores; a side wall rubber that is arranged on the tire outer surface side of the carcass ply and constitutes a tire outer surface; a chafer layer that is turned from the tire inner surface side to the tire outer surface side around the bead cores and the bead fillers and rolled up to an outer surface of the carcass ply; a pair of support rubbers (a tape rubber and a rear pad rubber) that are located between the side wall rubber and the carcass ply and arranged so as to hold a rolled-up end of the chafer layer from both sides in a tire width direction; and a tread rubber, in which a modulus value of the pair of support rubbers is higher than a modulus value of the side wall rubber, and the tread rubber contains silica, and a loss factor tan δ of the support rubbers meets 0.130 to 0.230, more preferably 0.170 to 0.230.

Furthermore, in the third aspect of the present invention, there is provided a pneumatic tire including: a pair of bead cores; a pair of bead fillers that are connected to the pair of bead cores and extend to the outer-diameter-side in a tire radial direction; a carcass ply that is suspended between the pair of bead cores; a side wall rubber that is arranged on the tire outer surface side of the carcass ply and constitutes a tire outer surface; a chafer layer that is turned from the tire inner surface side to the tire outer surface side around the bead cores and the bead fillers and rolled up to an outer surface of the carcass ply; a pair of support rubbers (a tape rubber and a rear pad rubber) that are located between the side wall rubber and the carcass ply and arranged so as to hold a rolled-up end of the chafer layer from both sides in a tire width direction; and a tread rubber, in which a modulus value of the pair of support rubbers is higher than a modulus value of the side wall rubber, and the tread rubber contains silica, and the rear pad rubber contains a resorcin-containing formaldehyde condensate.

According to the first and second aspects of the present invention, the rolled-up end of the chafer layer is held in the tire width direction by the support rubbers having a higher modulus than the side wall rubber; therefore, the concentration of distortion likely to be generated near the rolled-up end is suppressed. As a result, separation at the rolled-up end of the chafer layer is suppressed. Furthermore, in the first aspect, the tread rubber contains silica, which decreases the rolling resistance of the tire, and therefore the fuel efficiency can be improved. Moreover, in the second aspect, the tread rubber contains silica, which suppresses the generation of heat thereby improving the durability, and decreases the rolling resistance of the tire, and the fuel efficiency can be improved. Furthermore, in the third aspect, the rear pad rubber contains a Resorcin-containing formaldehyde condensate, which suppresses the generation of heat thereby improving the durability, and decreases the rolling resistance of the tire, and the fuel efficiency can be improved.

Preferably, the pair of support rubbers include a pad rubber (a rear pad rubber) adjacent to the tire-outer-surface-side of the rolled-up end of the chafer layer and a tape rubber adjacent to the tire-inner-surface-side of the rolled-up end of the chafer layer.

According to this configuration, the tape rubber is arranged between the rolled-up end of the chafer layer and the carcass ply; therefore, a level difference (step) formed on the outer surface of the carcass ply can be reduced by the tape rubber. As a result, the rolled-up end of the chafer layer is easily rolled up along the outer surface of the carcass ply. Accordingly, while the rolled-up end of the chafer layer is held in the tire width direction by the tape rubber and the rear pad rubber, an excessive level difference is not formed near the rolled-up end of the chafer layer, and therefore, bareness caused by the level difference is easily suppressed. As a result, separation at the rolled-up end of the chafer layer can be further suppressed.

In contrast, in a case where the rear pad rubber is arranged between the rolled-up end of the chafer layer and the carcass ply, a larger level difference is formed on the outer surface of the carcass ply due to the rear pad rubber, and the level difference is likely to cause bareness between the outer surface of the carcass ply and a member arranged on top of the level difference.

Furthermore, preferably, a position of an inner-diameter-end of the pad rubber in the tire radial direction is different from that of an inner-diameter-end of the tape rubber. More preferably, a position of an outer-diameter-end of the pad rubber in the tire radial direction is different from that of an outer-diameter-end of the tape rubber.

According to this configuration, the positions of respective ends of the pad rubber and the tape rubber in the tire radial direction where distortion is likely to be concentrate are different in the tire radial direction; therefore, it is possible to suppress the excessive concentration of distortion at the radial-direction ends.

Moreover, preferably, the rolled-up end of the chafer layer is located in a radial range from a position of 3% of a tire reference cross-section height to the inside in the tire radial direction to a position of 5% of the tire reference cross-section height to the outside in the tire radial direction with reference to outer-diameter-side ends of the bead cores.

According to this configuration, it is possible to prevent the rolled-up end of the chafer layer from being located excessively on the outer-diameter-side in the tire radial direction while the chafer layer is arranged to correspond to a contact portion of the bead part of the pneumatic tire with the rim flange. Accordingly, even in a case where the contact portion with the rim flange is worn, exposure of the carcass ply can be suppressed by the chafer layer.

Furthermore, by imposing a limitation on the height position of the rolled-up end of the chafer layer in the tire radial direction, the rolled-up end is easily arranged to be kept away from a portion of the side wall part where distortion is large, and an increase in distortion caused by deformation of the side wall part is suppressed. As a result, separation at the rolled-up end of the chafer layer is further suppressed.

Incidentally, if the rolled-up end of the chafer layer is located on the more than 3% inner-diameter-side of the tire reference cross-section height to the inside in the tire radial direction with reference to the outer-diameter-side end of the bead core, the carcass ply may be exposed when the bead part is worn. Furthermore, if the rolled-up end of the chafer layer is located on the more than 5% outer-diameter-side of the tire reference cross-section height to the outside in the tire radial direction with reference to the outer-diameter-side end of the bead core, the rolled-up end comes close to a portion of the side wall part where distortion is large, and therefore distortion is likely to increase excessively.

Furthermore, preferably, the rolled-up end of the chafer layer has an overlap with the pair of support rubbers over a length of 5 mm or more in the tire radial direction.

According to this configuration, the rolled-up end of the chafer layer is securely supported by the support rubbers over a length of at least 5 mm or more in the tire radial direction, and therefore, the concentration of distortion is suitably suppressed.

Moreover, preferably, the pad rubber is arranged in a radial range of 15% or more but not exceeding 45% of the tire reference cross-section height in the tire radial direction.

According to this configuration, the pad rubber is located over a predetermined range in the tire radial direction while being located to have an overlap with the rolled-up end of the chafer layer. Accordingly, distortion generated around the bead part of the pneumatic tire can be dispersed over the predetermined range in the tire radial direction through the pad rubber; therefore, it is possible to suppress distortion of the rolled-up end of the chafer layer. Incidentally, if the pad rubber is arranged in a radial range larger than 45% of the tire reference cross-section height, the proportion of the side wall rubber in the side wall part is excessively decreased, which deteriorates the fuel efficiency.

Furthermore, preferably, the tape rubber is arranged in a radial range of 5% or more but not exceeding 20% of the tire reference cross-section height in the tire radial direction.

According to this configuration, the tape rubber is located over a predetermined range in the tire radial direction while being located to have an overlap with the rolled-up end of the chafer layer. Accordingly, distortion generated around the bead part of the pneumatic tire can be dispersed over the predetermined range in the tire radial direction through the tape rubber; therefore, it is possible to suppress distortion of the rolled-up end of the chafer layer.

According to the first aspect of the present invention, in the pneumatic tire including the chafer layer in the bead part, it is possible to suppress the concentration of distortion at the rolled-up end of the chafer layer, thereby improving the durability. Furthermore, it is possible to decrease the rolling resistance of the tread rubber and improve the fuel efficiency.

Moreover, according to the second aspect of the present invention, in the pneumatic tire including the chafer layer in the bead part, it is possible to suppress the concentration of distortion at the rolled-up end of the chafer layer, to suppress the generation of heat and improve the durability, and to decrease the rolling resistance of the tread rubber and improve the fuel efficiency.

Furthermore, according to the third aspect of the present invention, in the pneumatic tire including the chafer layer in the bead part, it is possible to suppress the concentration of distortion at the rolled-up end of the chafer layer, to suppress the generation of heat and improve the durability, and to decrease the rolling resistance of the tire and improve the fuel efficiency.

BRIEF DESCRIPTION OF THE DRAWINGS

The foregoing and the other features of the present invention will become apparent from the following description and drawings of an illustrative embodiment of the invention in which.

DETAILED DESCRIPTION OF THE PREFERRED EMBODIMENTS

An embodiment of the present invention will be described below in accordance with accompanying drawings. Incidentally, the following description is merely an example in essence, and is not intended to limit the invention and applications or uses of the invention. Furthermore, the drawings are schematically depicted, and the ratio of dimensions, etc. are different from actual ones.

Figure 1:
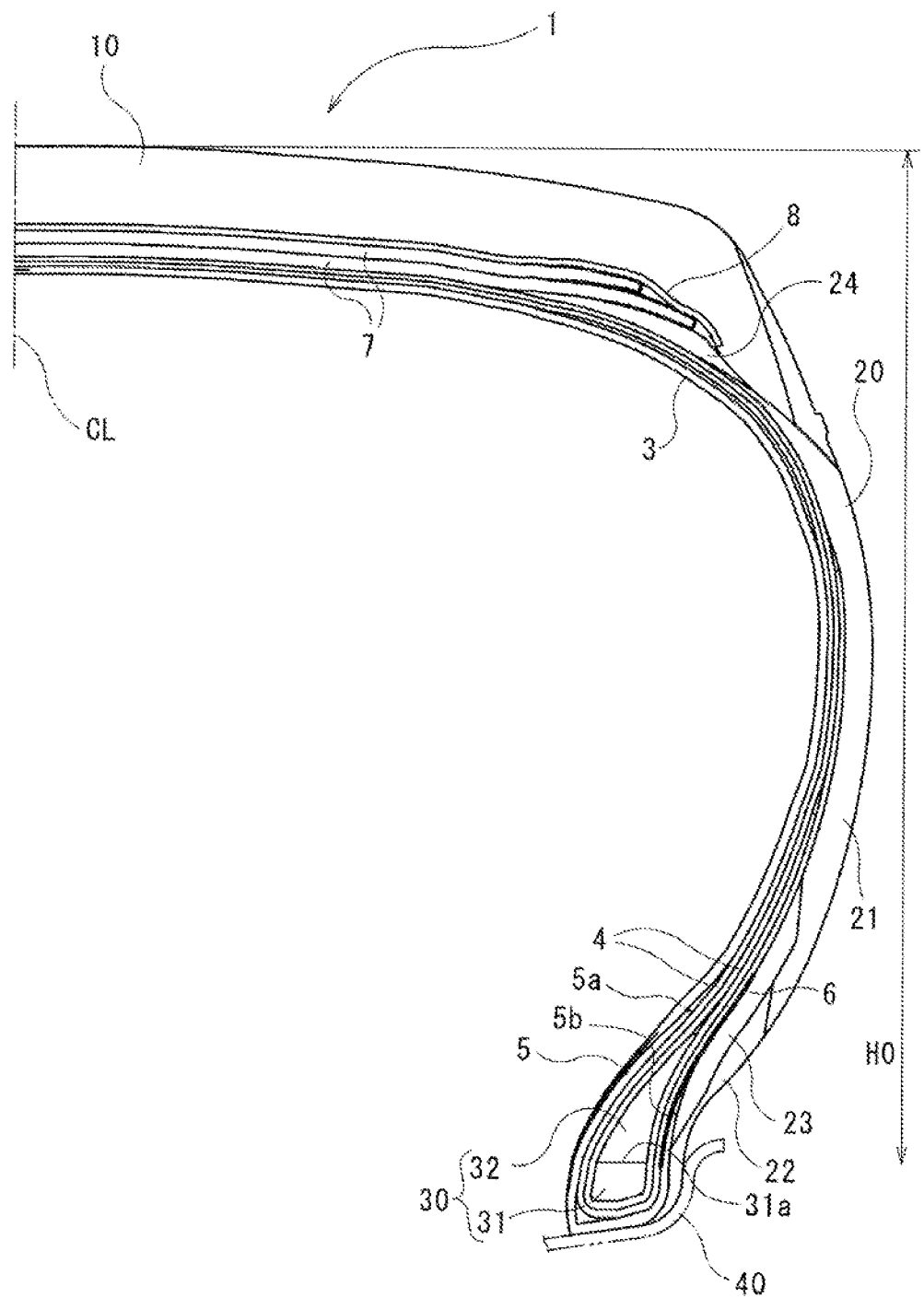
FIG. 1 is a meridional half sectional view of a pneumatic tire according to an embodiment of the present invention.

FIG. 1 is a meridional half sectional view of a pneumatic tire 1 according to the embodiment of the present invention, and illustrates only one side of the pneumatic tire 1 in a tire width direction along a tire equator line CL. The pneumatic tire 1 includes a tread part 10, a pair of side wall parts 20 that extend from ends of the tread part 10 in the tire width direction to the inside in a tire radial direction, and a pair of bead parts 30 that are located at respective inner ends of the pair of side wall parts 20 in the tire radial direction.

A carcass ply 4 is suspended between the pair of bead parts 30 over the tire-inner-surface-side of the tread part 10 and the side wall parts 20. In the present embodiment, the two-layered carcass ply 4 is provided. Between the tread part 10 and the carcass ply 4, a multi-layered belt layer 7 and a belt reinforcement layer 8 are wound in a tire circumferential direction in this order from the inside in the tire radial direction. An inner liner 3 is arranged on the tire-inner-surface-side of the carcass ply 4.

The bead part 30 includes a bead core 31 and a bead filler 32 that is connected to the bead core 31 and extends outward in the tire radial direction. The bead core 31 is a bundle of bead wires formed into an annular shape. The bead core 31 has an outer-diameter-side end surface 31a on its outer end surface in the tire radial direction. The bead filler 32 is a rubber material having a triangular cross-section formed into an annular shape along the outer-diameter-side end surface 31a of the bead core 31.

A chafer layer 5 is arranged around the bead part 30. The chafer layer 5 is arranged adjacent to the outer surface side (the side opposite to the bead part 30) of the carcass ply 4, and is turned from the inside to the outside in the tire width direction around the bead part 30 and rolled up to the outer-diameter-side in the tire radial direction together with the carcass ply 4. The chafer layer 5 is rubber-coated nylon or steel cords arranged side by side to a predetermined end number.

The chafer layer 5 has a rolled-in end 5a located on the inside in the tire width direction (the tire-inner-surface-side of the bead part 30) and a rolled-up end 5b located on the outside in the tire width direction (the tire-outer-surface-side of the bead part 30). A tape rubber 6 is arranged between the rolled-up end 5b of the chafer layer 5 and the carcass ply 4. The tape rubber 6 is a tape-like thin-walled member, and is configured to have an approximately constant thickness of, for example, 1 mm or less.

The side wall part 20 includes a side wall rubber 21, a rim strip rubber 22, a rear pad rubber 23, and an under-belt pad rubber 24.

The side wall rubber 21 constitutes a main body of the side wall part 20. Furthermore, the side wall rubber 21 forms an outer surface of the pneumatic tire 1; rubber excellent in weather resistance, resistance to external damage, and resistance to rolling resistance is adopted as the side wall rubber 21. The rim strip rubber 22 is located on the inside of the side wall part 20 in the tire radial direction, and is a portion that comes in contact with a rim flange 40 when attached to a wheel.

The rear pad rubber 23 is located adjacent to the tire-inner-surface-side of the side wall rubber 21 and the rim strip rubber 22. The rear pad rubber 23 is located on the inner-surface-side of the side wall rubber 21 and is not exposed to the air; rubber that is less likely to be distorted and has excellent adhesiveness to the carcass ply 4 is adopted as the rear pad rubber 23. The under-belt pad rubber 24 is arranged to fill a gap between an end of the belt layer 7 in the tire width direction and the carcass ply 4.

The side wall part 20 is configured so that in the order of the under-belt pad rubber 24, the rim strip rubber 22, the rear pad rubber 23, and the side wall rubber 21, their 100% modulus value is lower. Respective 100% modulus values of the members 21 to 24 are configured, for example, so that the under-belt pad rubber 24 has a 100% modulus values of 4.0 MPa or more but not exceeding 5.5 MPa; the rim strip rubber 22 has a 100% modulus values of 4.0 MPa or more but not exceeding 4.5 MPa; the rear pad rubber 23 has a 100% modulus values of 3.5 MPa or more but not exceeding 3.9 MPa; the side wall rubber 21 has a 100% modulus values of 1.0 MPa or more but not exceeding 2.4 MPa. Furthermore, rubber having the same 100% modulus value as the rear pad rubber 23 is adopted as the tape rubber 6. Incidentally, the 100% modulus of each member is a value obtained by dividing a tensile strength when a test piece defined in JIS K6251:2010 3.7 is subjected to 100% elongation by the initial cross-section area of the test piece. Incidentally, a dumbbell specimen type 3 is used as the test piece.

Figure 3:
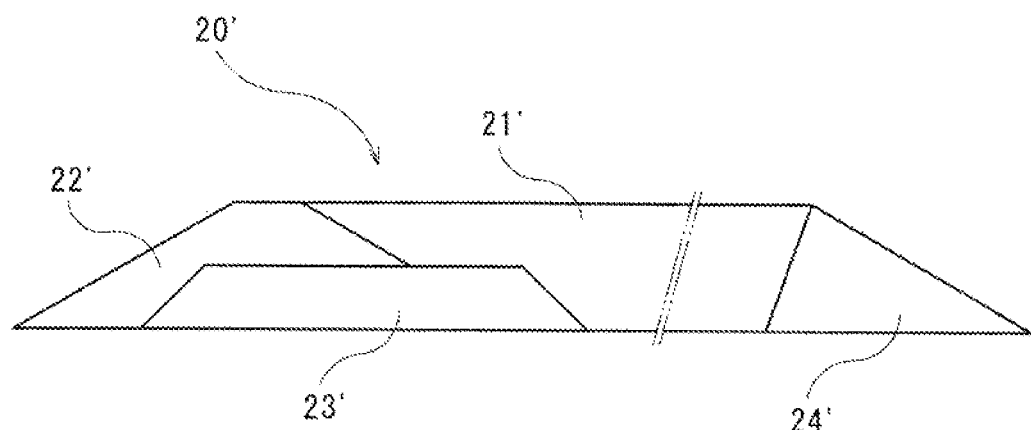
FIG. 3 is a diagram schematically showing a side wall member.

FIG. 3 schematically shows a side wall member 20' for forming the side wall part 20. The side wall part 20 is formed by winding the side wall member 20' into a cylindrical shape around a molding drum (not shown) and vulcanizing it within a tire vulcanizing mold (not shown).

In the present embodiment, for example, a side wall rubber member 21', a rim strip rubber member 22', a rear pad rubber member 23', and an under-belt pad rubber member 24' are each extruded from a nozzle and integrally formed into the side wall member 20'. These members 21' to 24' are vulcanized and formed into the side wall rubber 21, the rim strip rubber 22, the rear pad rubber 23, and the under-belt pad rubber 24, respectively.

Since these members 21' to 24' are integrally formed into the side wall member 20', the work to wind the side wall member 20' around the molding drum can be easily done as compared with a case where these members are individually constructed. Incidentally, these members 21' to 24' may be formed individually and each wound around the molding drum.

Subsequently, with reference to FIG. 2, respective positions of members located around the bead part 30 in the tire radial direction are described using the rate to a tire reference cross-section height based on the outer-diameter-side end surface 31a of the bead core 31. In a case where the rate to the tire reference cross-section height H0 is a positive value, which means it is located on the outer-diameter-side in the tire radial direction further than the outer-diameter-side end surface 31a of the bead core 31; in a case where the rate is a negative value, which means it is located on the inner-diameter-side in the tire radial direction further than the outer-diameter-side end surface 31a.

Incidentally, as shown in FIG. 1, in this specification, the tire reference cross-section height H0 means a height from the outer-diameter-side end surface 31a of the bead core 31 to a highest point (a point of intersection with the tire equator line CL) of an outside surface of the tread part 10, provided that a sample cut out a predetermined range in the tire circumferential direction (for example, a range of 20 mm in the tire circumferential direction) from a pneumatic tire in the tire radial direction is measured in a state where the width between the pair of bead parts 30 is set to a standard rim width. The standard rim width here is a rim defined for each tire in a standards system including the standard on which the tire is based; for example, the "Standard Rim" is used in JATMA, the "Design Rim" is used in TRA, and the "Measuring Rim" is used in ETRTO.

Figure 2:
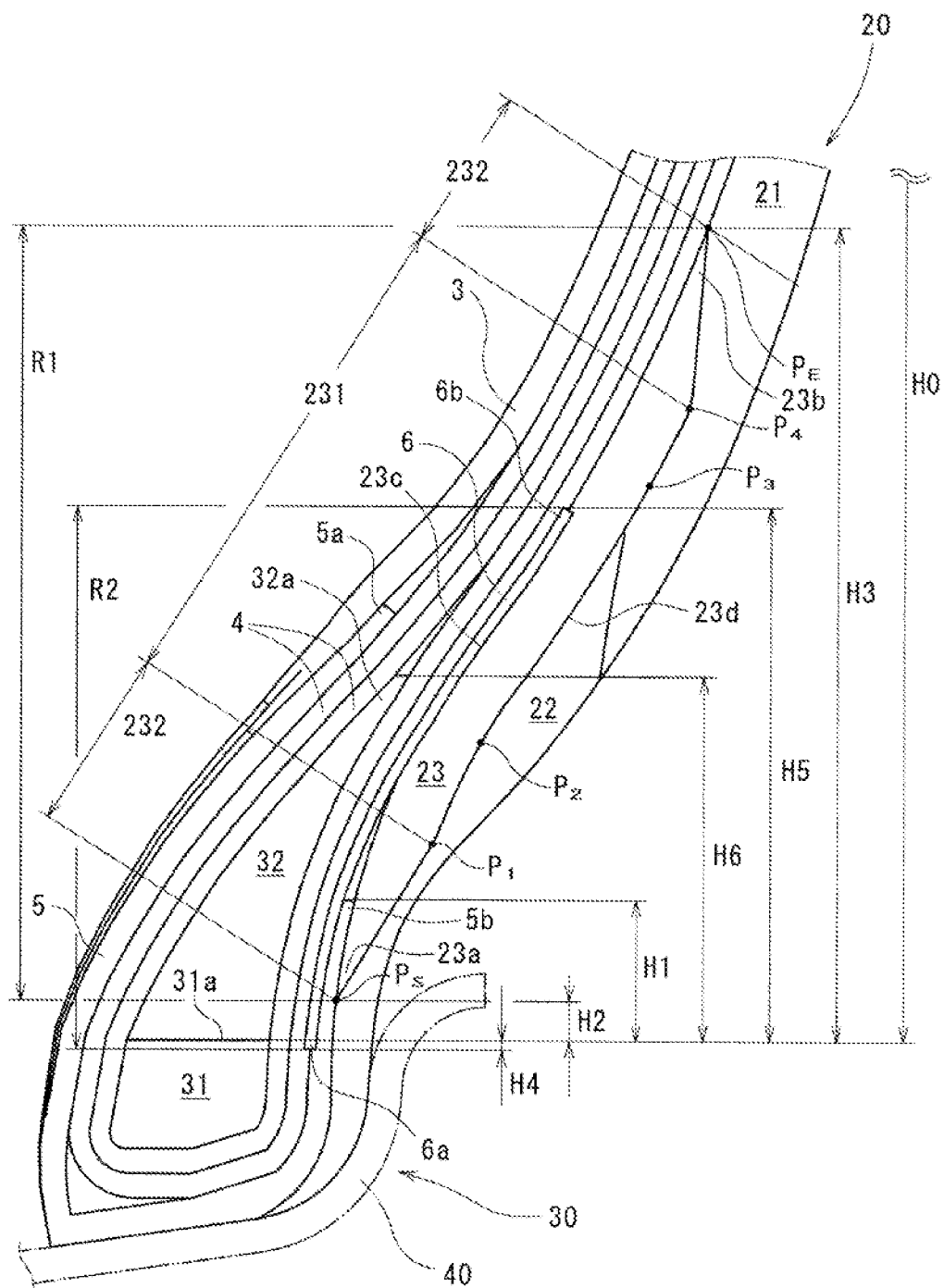
FIG. 2 is an enlarged view of around a bead part of the pneumatic tire shown in FIG. 1.

In FIG. 2, a height position H1 of the rolled-up end 5b of the chafer layer 5 is located in a range of −3% or more but not exceeding 5% of the tire reference cross-section height H0 to the outer-diameter-side end surface 31a of the bead core 31.

A height position H2 of an inner-diameter-side end 23a of the rear pad rubber 23 in the tire radial direction is located on 5 mm or more the tire-inner-diameter-side further than the rolled-up end 5b of the chafer layer 5 and in a range of −5% or more but not exceeding 3% of the tire reference cross-section height H0 to the outer-diameter-side end surface 31a of the bead core 31. Furthermore, a height position H3 of an outer-diameter-side end 23b of the rear pad rubber 23 in the tire radial direction is located in a range of 16% or more but not exceeding 45% of the tire reference cross-section height H0 to the outer-diameter-side end surface 31a of the bead core 31. Incidentally, the rear pad rubber 23 is arranged in a height range R1 of 15% or more but not exceeding 45% of the tire reference cross-section height H0.

A height position H4 of an inner-diameter-side end 6a of the tape rubber 6 in the tire radial direction is located on the tire-inner-diameter-side further than the inner-diameter-side end 23a of the rear pad rubber 23 and in a range of −6% or more but not exceeding 2% of the tire reference cross-section height H0 to the outer-diameter-side end surface 31a of the bead core 31; a height position H5 of an outer-diameter-side end 6b is located in a range of 10% or more but not exceeding 15% of the tire reference cross-section height H0 to the outer-diameter-side end surface 31a of the bead core 31. Incidentally, the tape rubber 6 is arranged in a height range R2 of 5% or more but not exceeding 20% of the tire reference cross-section height H0.

Furthermore, a height position H6 of an outer-diameter-side end 32a of the bead filler 32 is located on the inside in the tire radial direction further than the outer-diameter-side end 23b of the rear pad rubber 23 and in a range of 8% or more but not exceeding 40% of the tire reference cross-section height H0 to the outer-diameter-side end surface 31a of the bead core 31.

That is, the rolled-up end 5b of the chafer layer 5 is supported in the tire width direction by a pair of support rubbers composed of the tape rubber 6 and the rear pad rubber 23 that are arranged adjacent to the rolled-up end 5b in the tire width direction.

Subsequently, the rear pad rubber 23 is described in detail.

The rear pad rubber 23 is formed into a trapezoid that the inner surface 23c ($P_S$ to $P_E$ in FIG. 2), which comes in contact with outer surfaces of the chafer layer 5, the tape rubber 6, and the carcass ply 4, is long in the tire radial direction as compared with an outer surface 23d ($P_1$ to $P_4$ in FIG. 2), which extends approximately parallel to the inner surface 23c and comes in contact with inner surfaces of the side wall rubber 21 and the rim strip rubber 22. The rear pad rubber 23 has a constant thickness portion 231 and a pair of tapered thickness portions 232. The constant thickness portion 231 has an approximately constant thickness at a portion corresponding to the outer surface 23d. The pair of tapered thickness portions 232 have a thickness that gradually decreases from either end of the constant thickness portion 231 in the tire radial direction toward the tire radial direction.

In FIG. 2, a portion indicated by $P_S$ to $P_1$ is the tapered thickness portion 232 located on the inner-diameter-side in the tire radial direction; a portion located in $P_1$ to $P_4$ is the constant thickness portion 231; a portion indicated by $P_4$ to $P_E$ is the tapered thickness portion 232 located on the outer-diameter-side in the tire radial direction. That is, inflection points $P_1$ and $P_4$ at which a transition to the tapered thickness portion 232 is made exist in either end of the tire-outer-surface-side of the constant thickness portion 231 in the tire radial direction.

The constant thickness portion 231 is located on the outside in the tire radial direction further than the rolled-up end 5b of the chafer layer 5; that is, the tapered thickness portion 232 located on the inside in the tire radial direction is located adjacent to the rolled-up end 5b of the chafer layer 5.

Figure 4:
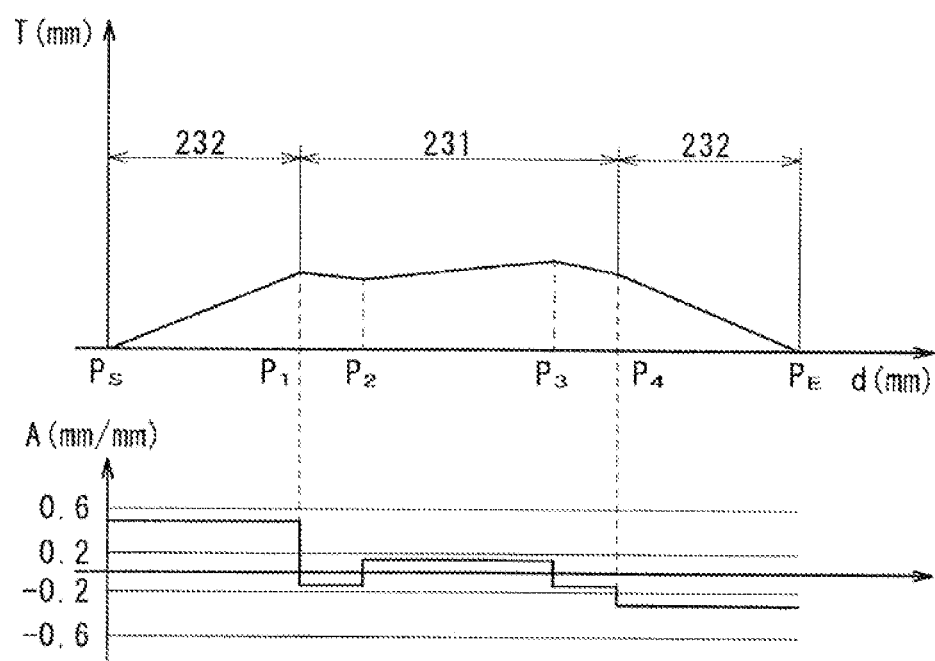
FIG. 4 is a graph showing a thickness of a pad rubber.

FIG. 4 is a graph showing a thickness T (mm) of the rear pad rubber 23. The thickness T of the rear pad rubber 23 is shown as a thickness in a direction perpendicular to the surface of the carcass ply 4. The graph shows the thickness T in each position at a distance d (mm) along the outer surface of the carcass ply 4 from one end of the rear pad rubber 23 in the tire radial direction toward the other end (in the present embodiment, from the inner-diameter-side end 23a ($P_S$) toward the outer-diameter-side end 23b ($P_E$)); that is, the thickness T is shown as a thickness function T(d) that is a function of the distance d. Furthermore, a slope A of the function T(d) is also shown.

As shown in FIG. 4, the constant thickness portion 231 means a portion having the slope A of the function T(d) of which the absolute value is 0.2 mm/mm or less; the tapered thickness portion 232 means a portion having the slope A of the function T(d) of which the absolute value is greater than 0.2 mm/mm. That is, according to the function T(d), the thickness of the inner-diameter-side tapered thickness portion 232 increases from $P_S$ toward $P_1$. The thickness of the constant thickness portion 231 is approximately constant from $P_1$ to $P_4$; however, specifically, the thickness slightly decreases from $P_1$ to $P_2$, and slightly increases from $P_2$ to $P_3$, and then slightly decreases from $P_3$ to $P_4$. Furthermore, the thickness of the outer-diameter-side tapered thickness portion 232 decreases from $P_4$ to $P_E$.

The constant thickness portion 231 is set to a height range of 7% or more but not exceeding 26% of the tire reference cross-section height H0. Furthermore, the tapered thickness portion 232 is preferably set to have the slope of the function T(d) of which the absolute value is 0.6 mm/mm or less, which makes it easy to secure the contact area of the tapered thickness portion 232 with the side wall rubber 21.

The pneumatic tire 1 described above achieves the following effects.

(1) The rolled-up end 5b of the chafer layer 5 is held in the tire width direction by the tape rubber 6 and the rear pad rubber 23 that have a higher modulus than the side wall rubber 21, and therefore, distortion likely to be generated near the rolled-up end 5b is suppressed. As a result, separation at the rolled-up end 5b of the chafer layer 5 is suppressed.

(2) The tape rubber 6 is arranged between the rolled-up end 5b of the chafer layer 5 and the carcass ply 4, and therefore, a level difference formed on the outer surface of the carcass ply 4 can be reduced by the tape rubber 6. As a result, the rolled-up end 5b of the chafer layer 5 is easily rolled up along the outer surface of the carcass ply 4. Accordingly, while the rolled-up end 5b of the chafer layer 5 is held in the tire width direction by the tape rubber 6 and the rear pad rubber 23, an excessive level difference is not formed near the rolled-up end 5b of the chafer layer 5, and therefore, bareness caused by the level difference is easily suppressed. As a result, separation at the rolled-up end 5b of the chafer layer 5 can be further suppressed.

In contrast, in a case where the rear pad rubber 23 is arranged between the rolled-up end 5b of the chafer layer 5 and the carcass ply 4, a larger level difference is formed on the outer surface of the carcass ply 4 due to the rear pad rubber 23, and the larger level difference is likely to cause bareness between the outer surface of the carcass ply 4 and a member arranged on top of the level difference.

(3) The positions of respective ends of the rear pad rubber 23 and the tape rubber 6 in the tire radial direction where distortion is likely to be concentrate are different in the tire radial direction; therefore, it is possible to suppress the excessive concentration of distortion on the radial-direction ends.

(4) The height position H1 of the rolled-up end 5b of the chafer layer 5 is located in a range of −3% or more but not exceeding 5% of the tire reference cross-section height H0 with reference to the outer-diameter-side end surface 31a of the bead core 31. Accordingly, it is possible to prevent the rolled-up end 5b of the chafer layer 5 from being located excessively on the outer-diameter-side in the tire radial direction while the chafer layer 5 is arranged to correspond to a contact portion of the bead part 30 of the pneumatic tire 1 with the rim flange 40. Accordingly, even in a case where a contact portion of the rim strip rubber 22 with the rim flange 40 is worn, exposure of the carcass ply 4 can be suppressed by the chafer layer 5.

Furthermore, by imposing a limitation on the height position of the rolled-up end 5b of the chafer layer 5 in the tire radial direction, the rolled-up end 5b is easily arranged to be kept away from a portion of the side wall part 20 where distortion is large, and an increase in distortion caused by deformation of the side wall part 20 is suppressed. As a result, separation at the rolled-up end 5b of the chafer layer 5 can be further suppressed.

Incidentally, if the rolled-up end 5b of the chafer layer 5 is located on the 3% or more inner-diameter-side of the tire reference cross-section height to the inside in the tire radial direction with reference to the outer-diameter-side end surface 31a of the bead core 31, the carcass ply 4 may be exposed when the bead part 30 is worn. Furthermore, if the rolled-up end 5b of the chafer layer 5 is located on the 5% or more outer-diameter-side of the tire reference cross-ssection height to the outside in the tire radial direction with reference to the outer-diameter-side end surface 31a of the bead core 31, the rolled-up end 5b comes close to a portion of the side wall part 20 where distortion is large, and therefore distortion is likely to increase excessively.

(5) The rolled-up end 5b of the chafer layer 5 is securely supported by the tape rubber 6 and the rear pad rubber 23 over a length of at least 5 mm or more in the tire radial direction, and therefore, the concentration of distortion is suitably suppressed.

(6) The rear pad rubber 23 is arranged in the height range R1 of 15% or more but not exceeding 45% of the tire reference cross-section height H0, and therefore is located over a predetermined range in the tire radial direction while being located to have an overlap with the rolled-up end 5b of the chafer layer 5. Accordingly, distortion generated around the bead part 30 of the pneumatic tire 1 can be dispersed over the predetermined range in the tire radial direction through the rear pad rubber 23; therefore, it is possible to suppress distortion of the rolled-up end 5b of the chafer layer 5. Incidentally, if the rear pad rubber 23 is arranged in a radial range larger than 45% of the tire reference cross-section height H0, the proportion of the side wall rubber 21 in the side wall part 20 is excessively decreased, which deteriorates the fuel efficiency.

Furthermore, the height position H6 of the outer-diameter-side end 32a of the bead filler 32 is located on the inside in the tire radial direction further than the outer-diameter-side end 23b of the rear pad rubber 23. Accordingly, distortion likely to be generated near the outer-diameter-side end 32a of the bead filler 32 is suppressed by the rear pad rubber 23. Therefore, around the bead part 30, separation at not only the rolled-up end 5b of the chafer layer 5 but also near the outer-diameter-side end 32a of the bead filler 32 is suitably suppressed.

(7) The tape rubber 6 is arranged in the height range R2 of 5% or more but not exceeding 20% of the tire reference cross-section height H0, and therefore is located over a predetermined range in the tire radial direction while being located to have an overlap with the rolled-up end 5b of the chafer layer 5. Accordingly, distortion generated around the bead part 30 of the pneumatic tire 1 can be dispersed over the predetermined range in the tire radial direction through the tape rubber 6, and therefore, distortion of the rolled-up end 5b of the chafer layer 5 is suppressed.

(8) The rear pad rubber 23 has the constant thickness portion 231 over a height range of 7% or more but not exceeding 26% of the tire reference cross-section height H0, and therefore, distortion generated around the bead part 30 of the pneumatic tire 1 can be dispersed over a predetermined range in the tire radial direction through the rear pad rubber 23. Accordingly, distortion of the rolled-up end 5b of the chafer layer 5 is further reduced.

If the height range of the constant thickness portion 231 is smaller than 7% of the tire reference cross-section height H0, the distortion dispersion effect of the constant thickness portion 231 is reduced. If the height range of the constant thickness portion 231 is larger than 26% of the tire reference cross-section height H0, the proportion of the rear pad rubber 23 in the side wall part 20 is excessively increased, and the proportion of the side wall rubber 21 is excessively decreased, which diminishes the enhancing effect in the rolling-resistance performance due to the side wall rubber 21, and therefore, the fuel efficiency is likely to deteriorate.

(9) The constant thickness portion 231 is a portion of the rear pad rubber 23 having the slope A of the thickness function T(d) of which the absolute value is 0.2 mm/mm or less. Accordingly, the constant thickness portion 231 has too small variations in thickness to disperse a distortion generated around the bead part 30 widely in the tire radial direction.

(10) The constant thickness portion 231 of the rear pad rubber 23 is not located at the rolled-up end 5b of the chafer layer 5, and therefore, the capacity of the rim strip rubber 22 arranged on the tire-outer-surface-side of the rolled-up end 5b of the chafer layer 5 is easily secured.

(11) The tapered thickness portion 232 is a portion of the rear pad rubber 23 having the slope A of the thickness function T(d) of which the absolute value is greater than 0.2 mm/mm but not exceeding 0.6 mm/mm. Accordingly, it is possible to suppress separation at the tapered thickness portion 232 while preventing the tapered thickness portion 232 from being excessively long.

That is, if the absolute value of the slope A of the tapered thickness portion 232 is 0.2 mm/mm or less, the tapered thickness portion 232 becomes long, and the proportion of the side wall rubber 21 in the side wall part 20 is excessively decreased, which diminishes the enhancing effect in the rolling-resistance performance due to the side wall rubber 21, and therefore, the fuel efficiency is likely to deteriorate. Furthermore, if the absolute value of the slope A of the tapered thickness portion 232 is greater than 0.6 mm/mm, the tapered thickness portion 232 becomes short, and the contact area of the tapered thickness portion 232 with the side wall rubber 21 is reduced, and as a result, the adhesiveness of the tapered thickness portion 232 of the rear pad rubber 23 is likely to be reduced, and the separation-resistance performance is likely to deteriorate.

In the above-described embodiment, a case where the tape rubber 6 and the rear pad rubber 23 are made of the same rubber material is described as an example. However, as long as the tape rubber 6 and the rear pad rubber 23 have a higher modulus than the side wall rubber 21, different rubber materials may be adopted.

In a first aspect of the present invention, the above-described pneumatic tire according to the invention includes a tread rubber including a rubber composition, and the present invention also relates to the rubber composition included in the tread rubber.

Furthermore, in second and third aspects of the present invention, the above-described pneumatic tire according to the invention includes a tread rubber including a rubber composition (I) and a rear pad including a rubber composition (II), and the present invention also relates to the rubber composition (I) included in the tread rubber and the rubber composition (II) included in the rear pad.

The rubber composition according to the first aspect and the rubber composition (I) according to the second and third aspects of the present invention contain (A) diene-containing rubber, (B) silica, and (C) additives.

(A) Diene-Containing Rubber

The diene-containing rubber used in the rubber composition according to the first aspect and the rubber composition (I) according to the second and third aspects of the present invention includes, for example, natural rubber (NR), isoprene rubber (IR), butadiene rubber (BR), styrene-butadiene rubber (SBR), styrene-isoprene rubber, butadiene-isoprene rubber, styrene-butadiene-isoprene rubber, nitrile rubber (NBR), and the like, and one or more types of these can be used in combination. The diene-containing rubber is, more preferably, at least one type selected from styrene-butadiene rubber (SBR), butadiene rubber (BR), and natural rubber (NR).

As an embodiment of the first to third aspects of the present invention, in a case where styrene-butadiene rubber (SBR), butadiene rubber (BR), and natural rubber (NR) are used in combination, it is preferable that 0 to 100 parts by mass of styrene-butadiene rubber (SBR), 0 to 50 parts by mass of butadiene rubber (BR), and 0 to 50 parts by mass of natural rubber (NR) are contained in a total of 100 parts by mass of these diene-containing rubbers.

Furthermore, as the diene-containing rubber used in the rubber composition according to the first aspect and the rubber composition (I) according to the second and third aspects of the present invention, a modified diene-containing rubber in which at least one kind of functional group selected from a group consisting of a hydroxyl group, an amino group, a carboxyl group, an alkoxy group, an alkoxysilyl group, and an epoxy group is introduced into a molecular end or a molecular chain of the rubber may be used. Here, a primary amino group, a secondary amino group, or a tertiary amino group can be introduced as the amino group. Furthermore, an acid anhydride group can be also introduced as the carboxyl group. Moreover, a C1-C4 alkoxyl group can be introduced as the alkoxyl group, and a silyl group, such as a trialkoxysilyl group or an alkyl-dialkoxysilyl group, in which at least one of three atoms of hydrogen in the silyl group is replaced with an alkoxysilyl group can be introduced as the alkoxysilyl group. These functional groups interact with a silanol group on the silica surface and contribute to improving the silica dispersion performance. As the modified diene-containing rubber, modified SBR and/or modified BR is preferable. In an embodiment, the diene-containing rubber may be the modified diene-containing rubber alone, or may be a mixture of the modified diene-containing rubber and the native diene-containing rubber. In an embodiment, 20 to 80 parts by mass of the modified diene-containing rubber (for example, modified SBR) and 20 to 80 parts by mass of the native diene-containing rubber (for example, SBR, BR, and/or NR) may be contained in a total of 100 parts by mass of the diene-containing rubber.

(B) Silica

Silica contained in the rubber composition according to the first aspect and the rubber composition (I) according to the second and third aspects of the present invention preferably includes, but not particularly limited to, wet silica, such as wet precipitated silica or wet gelled silica. Although the colloidal properties of silica are not particularly limited, but silica having a nitrogen adsorption specific surface area by the BET method (BET) of preferably 90 to 250 m²/g, more preferably 100 to 230 m²/g is used. This BET value is measured in conformity to the BET method described in ISO 5794.

The mixing amount of silica is generally 10 to 150 parts by mass, preferably 20 to 120 parts by mass, more preferably 40 to 100 parts by mass relative to a total of 100 parts by mass of the diene-containing rubber contained in the rubber composition according to the first aspect.

The mixing amount of silica is generally 10 to 150 parts by mass, preferably 20 to 120 parts by mass relative to a total of 100 parts by mass of diene-containing rubber contained in the rubber composition (I) according to the second and third aspects.

Furthermore, to improve the silica dispersion performance, a silane coupling agent can be mixed into the rubber composition according to the first aspect and the rubber composition (I) according to the second and third aspects of the present invention. The silane coupling agent includes sulfide silane, mercapto silane, and the like. The mixing amount of the silane coupling agent is not particularly limited to, but is generally 3 to 15% by mass, preferably 5 to 10% by mass relative to the mixing amount of silica.

(C) Additives

Furthermore, besides the above-described components, various additives commonly used in a rubber composition included in a tire, such as carbon black, process oil, zinc white, stearic acid, an antioxidant, wax, sulfur, a vulcanizing accelerator, can be mixed into the rubber composition according to the first aspect and the rubber composition (I) according to the second and third aspects of the present invention.

In the rubber composition according to the first aspect of the present invention, the mixing amount of the additives is 10 to 100 parts by mass, preferably 30 to 80 parts by mass relative to a total of 100 parts by mass of diene-containing rubber contained in the rubber composition.

Furthermore, in the rubber composition (I) according to the second aspect of the present invention, the mixing amount of the additives is 10 to 120 parts by mass, preferably 40 to 100 parts by mass relative to a total of 100 parts by mass of the diene-containing rubber contained in the rubber composition (I).

Moreover, in the rubber composition (I) according to the third aspect of the present invention, the mixing amount of the additives is 10 to 100 parts by mass, preferably 15 to 60 parts by mass relative to a total of 100 parts by mass of the diene-containing rubber contained in the rubber composition (I).

The rubber composition according to the first aspect and the rubber composition (I) according to the second and third aspects of the present invention can be produced by kneading and mixing the above-described components (A) to (C) in accordance with the usual manner by means of a mixer, such as a Banbury mixer, a kneader, and a roller. That is, the rubber composition can be prepared in such a manner that at the first mixing stage, together with silica and a silane coupling agent if desired, additives other than sulfur and a vulcanizing accelerator are added and mixed into the diene-containing rubber, and at the final stage, sulfur and the vulcanizing accelerator are added into this mixture.

EXAMPLES

Subsequently, examples of the first to third aspects of the present invention are provided; however, the invention is not limited to these examples.

First Aspect

[Raw Materials]

Raw materials used in a composition according to an example are as follows.

SBR1: Emulsion polymerized styrene-butadiene rubber, "SBR1502" available from JSR Corporation SBR2: Modified styrene butadiene rubber, "HPR350" available from JSR Corporation BR: Butadiene rubber, "BR150B" available from Ube Industries, Ltd.

NR: Natural rubber, "RSS #3"

Silica: "Ultrasil VN3" available from Evonik Japan Co., Ltd.

Carbon black: "Seast 3" available from TOKAI CARBON CO., LTD.

Process oil: "Process NC140" available from JXTG Nippon Oil & Energy Corporation Zinc white: "Zinc White No. 3" available from MITSUI MINING & SMELTING CO., LTD.

Stearic acid: "Lunac S-20" available from Kao Corporation

Antioxidant: "Nocrac 6C" available from OUCHI SHINKO CHEMICAL INDUSTRIAL CO., LTD Wax: "OZOACE-0355" available from NIPPON SEIRO CO., LTD.

Silane coupling agent: "Si69" available from Evonik Japan Co., Ltd.

Sulfur: "SULFUR POWDER" available from Tsurumi Chemical Industry Co., Ltd.

Vulcanizing accelerator: "SOXINOL CZ" available from Sumitomo Chemical CO., Ltd.

[Evaluation Method]

Rolling resistance: A rolling resistance when a single-axis drum tester for rolling resistance measurement was running at 80 km/h under a temperature of 23° C. with a pneumatic pressure of 230 kPa and a load of 450 kgf was measured. A result was shown in an index with a value of Comparative Example 1 as a base of 100. The lower the index, the lower the rolling resistance, thus the better the fuel efficiency.

Durability: With a pneumatic pressure of 0 kPa and an applied load of 4.0 kN, a tire was run on a steel drum having a diameter of 1707 mm at a speed of 80 km/h until a failure occurred in the tire. A result was shown in an index with a travel distance of Comparative Example 1 as a base of 100. The higher the index, the more excellent the durability.

A rubber composition was prepared in such a manner that at the first mixing stage, additives other than sulfur and a vulcanizing accelerator were added and kneaded into the diene-containing rubber (SBR, BR, NR) by using a Banbury mixer in accordance with the composition (parts by mass) shown in the following Table 1, and at the final mixing stage, sulfur and the vulcanizing accelerator were added and kneaded into the obtained mixture. Using a tire (tire size: 235/65R16C 115/113R) produced by vulcanizing the obtained rubber composition, for example, at 140 to 180° C., the rolling resistance and the durability were evaluated in accordance with the above-described evaluation method. A result is shown in Table 1. As a support rubber, a general rubber composition properly containing BR and NR provided as diene-containing rubber as a major ingredient, and carbon black and other raw materials was used.

TABLE 1

| | | Comparative Example 1 | Comparative Example 2 | Comparative Example 3 | Example 1 | Example 2 | Example 3 | Example 4 | Example 5 | Example 6 |
|---|---|---|---|---|---|---|---|---|---|---|
| Tread rubber | SBR1 | 60 | 60 | 40 | 40 | — | — | 20 | — | — |
| | SBR2 | — | — | — | — | 100 | 100 | 60 | 80 | 80 |
| | BR | 20 | 20 | 30 | 30 | — | — | 20 | 20 | — |
| | NR | 20 | 20 | 30 | 30 | — | — | — | — | 20 |
| | Silica | — | — | 80 | 80 | 80 | 40 | 80 | 100 | 100 |
| | Carbon black | 70 | 70 | 5 | 5 | 5 | 35 | 5 | 5 | 5 |
| | Oil | 40 | 40 | 30 | 30 | 40 | 30 | 40 | 50 | 50 |
| | Zinc white | 2 | 2 | 2 | 2 | 2 | 2 | 2 | 2 | 2 |
| | Stearic acid | 2 | 2 | 2 | 2 | 2 | 2 | 2 | 2 | 2 |
| | Antioxidant | 2 | 2 | 2 | 2 | 2 | 2 | 2 | 2 | 2 |
| | Wax | 2 | 2 | 2 | 2 | 2 | 2 | 2 | 2 | 2 |
| | Silane coupling agent | — | — | 6 | 6 | 6 | 3 | 6 | 8 | 8 |
| | Sulfur | 2 | 2 | 2 | 2 | 2 | 2 | 2 | 2 | 2 |
| | Vulcanizing accelerator | 2 | 2 | 4 | 4 | 4 | 4 | 4 | 4 | 4 |
| Support rubber | | — | ○ | — | ○ | ○ | ○ | ○ | ○ | ○ |
| Rolling resistance INDEX | | 100 | 105 | 75 | 80 | 70 | 85 | 75 | 80 | 75 |
| Durability INDEX | | 100 | 125 | 80 | 100 | 130 | 100 | 120 | 100 | 115 |

As against the tire produced from the rubber composition according to Comparative Example 1, in a tire produced from a rubber composition according to Comparative Example 2 that includes a pair of support rubbers arranged to hold a rolled-up end of a chafer layer from its both sides in the tire width direction, although improvement in durability was seen, the rolling resistance was increased. Meanwhile, as against the rubber composition according to Comparative Example 1, in a tire produced from a rubber composition mixed with silica according to Comparative Example 3, the rolling resistance was decreased, thus improvement in fuel efficiency was able to be expected; however, the durability was reduced. Accordingly, as against the rubber composition according to Comparative Example 1, in tires according to Examples 1 to 6 that includes a pair of support rubbers produced from a rubber composition mixed with silica, while the durability was maintained or improved, the rolling resistance was decreased, thus improvement in fuel efficiency was able to be expected.

Second Aspect

[Raw Materials]

Raw materials used in a composition according to an example are as follows.

SBR1: Emulsion polymerized styrene butadiene rubber, "SBR1502" available from JSR Corporation SBR2: Modified styrene butadiene rubber, "HPR350" available from JSR Corporation BR1: Butadiene rubber, "BR150B" available from Ube Industries, Ltd.

BR2: Butadiene rubber, "Buna CB22" available from LANXESS

NR: Natural rubber, "RSS #3"

Silica: "Ultrasil VN3" available from Evonik Japan Co., Ltd.

Carbon black: "Seast 3" available from TOKAI CARBON CO., LTD.

Process oil: "Process NC140" available from JXTG Nippon Oil & Energy Corporation Zinc white: "Zinc White No. 3" available from MITSUI MINING & SMELTING CO., LTD.

Stearic acid: "Lunac S-20" available from Kao Corporation

Antioxidant: "Nocrac 6C" available from OUCHI SHINKO CHEMICAL INDUSTRIAL CO., LTD.

Wax: "OZOACE-0355" available from NIPPON SEIRO CO., LTD.

Silane coupling agent: "Si69" available from Evonik Japan Co., Ltd.

Sulfur: "SULFUR POWDER" available from Tsurumi Chemical Industry Co., Ltd.

Vulcanizing accelerator: "SOXINOL CZ" available from Sumitomo Chemical CO., Ltd.

Resorcin: "Resorcinol" available from Sumitomo Chemical CO., Ltd.

Hexamethoxymethylmelamine: "Sairettsu 963L (hexamethoxymethylmelamine)" available from DAICEL-ALLNEX LTD.

DZ: "Nocceler DZ-G (N,N-Dicyclohexyl-2-benzothiazolyl sulfenamide)" available from OUCHI SHINKO CHEMICAL INDUSTRIAL CO., LTD NS: "Nocceler NS-P (N-t-butyl-2-benzothiazolyl sulfenamide)" available from OUCHI SHINKO CHEMICAL INDUSTRIAL CO., LTD

[Evaluation Method]

Rolling resistance: A rolling resistance when a single-axis drum tester for rolling resistance measurement was running at 80 km/h under a temperature of 23° C. with a pneumatic pressure of 230 kPa and a load of 450 kgf was measured. A result was shown in an index with a value of Comparative Example 4 as a base of 100. The lower the index, the lower the rolling resistance, thus the better the fuel efficiency.

Durability: With a pneumatic pressure of 0 kPa and an applied load of 4.0 kN, a tire was run on a steel drum having a diameter of 1707 mm at a speed of 80 km/h until a failure occurred in the tire. A result was shown in an index with a travel distance of Comparative Example 4 as a base of 100. The higher the index, the more excellent the durability.

Loss factor tan δ: A loss factor tan δ was measured under conditions of a frequency of 10 Hz, initial strain of 10%, dynamic strain of 1%, and a temperature of 60° C. based on JIS K6394-2007.

A rubber composition was prepared in such a manner that at the first mixing stage, additives other than sulfur and a vulcanizing accelerator were added and kneaded into diene-containing rubber (SBR, BR, NR) by using a Banbury mixer in accordance with the composition (parts by mass) shown in the following Table 2, and at the final mixing stage, sulfur and the vulcanizing accelerator were added and kneaded into the obtained mixture. Using a tire (tire size: 235/65R16C 115/113R) produced by vulcanizing the obtained rubber composition, for example, at 140 to 180° C., the rolling resistance and the durability were evaluated in accordance with the above-described evaluation method. A result is shown in Table 2.

As against a tire according to Comparative Example 4 that includes a tread produced from a composition (I) and a rear pad produced from a composition (II) with mix proportion A, in a case where a tread mixed with silica is adopted, it is generally known that while the rolling resistance is drastically improved, the durability is reduced (Comparative Example 8). Accordingly, we considered the issue of improving the durability while maintaining this improved rolling resistance. As shown in Table 2, in tires according to Examples 8 to 12 that include a rear pad rubber, the durability was drastically improved while the improved rolling resistance was maintained.

TABLE 2

|  |  | Comparative Example 4 | Comparative Example 5 | Comparative Example 6 | Comparative Example 7 | Comparative Example 8 | Example 7 | Example 8 | Example 9 | Example 10 | Example 11 | Example 12 |
|---|---|---|---|---|---|---|---|---|---|---|---|---|
| Composition (i) Tread rubber | SBR1 | 60 | 60 | 60 | 60 | 40 | — | — | — | — | — | — |
|  | SBR2 | — | — | — | — | — | 40 | 40 | 40 | — | 100 | 80 |
|  | BR1 | 20 | 20 | 20 | 20 | 30 | 30 | 30 | 30 | 50 | — | 10 |
|  | NR | 20 | 20 | 20 | 20 | 30 | 30 | 30 | 30 | 50 | — | 10 |
|  | Silica | — | — | — | — | 80 | 80 | 80 | 80 | 30 | 100 | 40 |
|  | Carbon black | 70 | 70 | 70 | 70 | 5 | 5 | 5 | 5 | 30 | 5 | 30 |
|  | Oil | 40 | 40 | 40 | 40 | 30 | 30 | 30 | 30 | 25 | 40 | 35 |
|  | Zinc white | 2 | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 | 2 |
|  | Antioxidant | 2 | 2 | 2 | 2 | 2 | 2 | 2 | 2 | 2 | 2 | 2 |
|  | Wax | 2 | 2 | 2 | 2 | 2 | 2 | 2 | 2 | 2 | 2 | 2 |
|  | Silane coupling agent | — | — | — | — | 6 | 6 | 6 | 6 | 2 | 6 | 3 |
|  | Sulfur | 2 | 2 | 2 | 2 | 2 | 2 | 2 | 2 | 2 | 2 | 2 |
|  | Vulcanizing accelerator | 2 | 2 | 2 | 2 | 4 | 4 | 4 | 4 | 4 | 4 | 4 |
| Composition (ii) Support rubber | Mix proportion A | ○ | — | — | — | ○ | — | — | — | — | — | — |
|  | Mix proportion B | — | ○ | — | — | — | ○ | — | — | — | — | — |
|  | Mix proportion C | — | — | ○ | — | — | — | ○ | — | — | — | — |
|  | Mix proportion D | — | — | — | ○ | — | — | — | ○ | ○ | ○ | ○ |
|  | Rolling resistance INDEX | 100 | 95 | 100 | 95 | 75 | 65 | 70 | 65 | 70 | 90 | 80 |
|  | Durability INDEX | 100 | 145 | 120 | 150 | 80 | 160 | 150 | 175 | 175 | 160 | 170 |

TABLE 3

|  | Mix proportion A | Mix proportion B | Mix proportion C | Mix proportion D |
|---|---|---|---|---|
| NR | 40 | 100 | 40 | 40 |
| BR1 | 60 | — | 60 | — |
| BR2 | — | — | — | 60 |
| Carbon black | 62 | 52 | 52 | 52 |
| Silica | — | 10 | — | — |
| Oil | 7 | 5 | 7 | 7 |
| Stearic acid | 2 | 2 | 2 | 2 |
| Zinc white | 3.5 | 6 | 3.5 | 3.5 |
| Antioxidant | 1 | 1 | 1 | 1 |
| Resorcin | — | 1.3 | — | — |
| Hexamethoxymethylmelamine | — | 0.8 | — | — |
| DZ | — | 0.3 | — | — |
| NS | 1.5 | 0.3 | 1.5 | 1.5 |
| Sulfur | 3 | 4 | 3 | 3 |
| Loss factor tanδ | 0.244 | 0.188 | 0.222 | 0.191 |

Third Aspect
[Raw Materials]
Raw materials used in a composition according to an example are as follows.
SBR1: Styrene butadiene rubber, "SBR1502" available from JSR Corporation
SBR2: Modified styrene butadiene rubber, "HPR350" available from JSR Corporation
BR: Butadiene rubber, "BR150B" available from Ube Industries, Ltd.
NR: Natural rubber, "RSS #3"
Silica: "Ultrasil VN3" available from Evonik Japan Co., Ltd.
Carbon black: "Seast 3" available from TOKAI CARBON CO., LTD.
Process oil: "Process NC140" available from JXTG Nippon Oil & Energy Corporation
Zinc white: "Zinc White No. 3" available from MITSUI MINING & SMELTING CO., LTD.
Stearic acid: "Lunac S-20" available from Kao Corporation
Antioxidant: "Nocrac 6C" available from OUCHI SHINKO CHEMICAL INDUSTRIAL CO., LTD.
Wax: "OZOACE-0355" available from NIPPON SEIRO CO., LTD.

Silane coupling agent: "Si69" available from Evonik Japan Co., Ltd.
Sulfur: "SULFUR POWDER" available from Tsurumi Chemical Industry Co., Ltd.
Vulcanizing accelerator: "SOXINOL CZ" available from Sumitomo Chemical CO., Ltd.

Resorcin: "Resorcinol" available from Sumitomo Chemical CO., Ltd.
Resorcin-containing formaldehyde condensate: "SUMIKANOL 620" (resorcin-alkylphenol-formalin copolymer resin) available from Sumitomo Chemical CO., Ltd.
Hexamethoxymethylmelamine: "Sairettsu 963L" available from DAICEL-ALLNEX LTD.
DZ: "Nocceler DZ-G" (N,N-Dicyclohexyl-2-benzothiazolyl sulfenamide)" available from OUCHI SHINKO CHEMICAL INDUSTRIAL CO., LTD
NS: "Nocceler NS-P" (N-t-butyl-2-benzothiazolyl sulfenamide) available from OUCHI SHINKO CHEMICAL INDUSTRIAL CO., LTD

[Evaluation Method]

Rolling resistance: A rolling resistance when a single-axis drum tester for rolling resistance measurement was running at 80 km/h under a temperature of 23° C. with a pneumatic pressure of 230 kPa and a load of 450 kgf was measured. A result was shown in an index with a value of Comparative Example 9 as a base of 100. The lower the index, the lower the rolling resistance, thus the better the fuel efficiency.

Durability: With a pneumatic pressure of 0 kPa and an applied load of 4.0 kN, a tire was run on a steel drum having a diameter of 1707 mm at a speed of 80 km/h until a failure occurred in the tire. A result was shown in an index with a travel distance of Comparative Example 9 as a base of 100. The higher the index, the more excellent the durability.

A rubber composition was prepared in such a manner that at the first mixing stage, additives other than sulfur and a vulcanizing accelerator were added and kneaded into diene-containing rubber (SBR, BR, NR) by using a Banbury mixer in accordance with the composition (parts by mass) shown in the following Table 4, and at the final mixing stage, sulfur and the vulcanizing accelerator were added and kneaded into the obtained mixture. Using a tire (tire size: 235/65R16C 115/113R) produced by vulcanizing the obtained rubber composition, for example, at 140 to 180° C., the rolling resistance and the durability were evaluated in accordance with the above-described evaluation method. A result is shown in Table 4.

TABLE 4

|  |  | Comparative Example 9 | Comparative Example 10 | Comparative Example 11 | Example 13 | Example 14 | Example 15 | Example 16 |
|---|---|---|---|---|---|---|---|---|
| Composition (I) Tread rubber | SBR1 | 60 | 60 | 40 | 40 | — | — | — |
|  | SBR2 | — | — | — | — | — | 100 | 80 |
|  | BR | 20 | 20 | 30 | 30 | 50 | — | 10 |
|  | NR | 20 | 20 | 30 | 30 | 50 | — | 10 |
|  | Silica | — | — | 80 | 80 | 30 | 100 | 40 |
|  | Carbon black | 70 | 70 | 5 | 5 | 30 | 5 | 30 |
|  | Oil | 40 | 40 | 30 | 30 | 25 | 40 | 35 |
|  | Zinc white | 2 | 2 | 2 | 2 | 2 | 2 | 2 |
|  | Stearic acid | 2 | 2 | 2 | 2 | 2 | 2 | 2 |
|  | Antioxidant | 2 | 2 | 2 | 2 | 2 | 2 | 2 |
|  | Wax | 2 | 2 | 2 | 2 | 2 | 2 | 2 |
|  | Silane coupling agent | — | — | 6 | 6 | 2 | 6 | 3 |
|  | Sulfur | 2 | 2 | 2 | 2 | 2 | 2 | 2 |
|  | Vulcanizing accelerator | 2 | 2 | 4 | 4 | 4 | 4 | 4 |
| Composition (II) Support rubber | Mix proportion A | ○ | — | ○ | — | — | — | — |
|  | Mix proportion B | — | ○ | — | ○ | ○ | ○ | ○ |
| Rolling resistance INDEX |  | 100 | 95 | 70 | 65 | 70 | 90 | 80 |
| Durability INDEX |  | 100 | 120 | 110 | 130 | 130 | 120 | 125 |

TABLE 5

|  | Mix proportion A | Mix proportion B |
|---|---|---|
| NR | 100 | 100 |
| BR | — | — |
| Carbon black | 52 | 52 |
| Silica | 10 | 10 |
| Oil | 5 | 5 |
| Stearic acid | 2 | 2 |
| Zinc white | 6 | 6 |
| Antioxidant | 1 | 1 |
| Resorcin | 1.3 | — |
| Resorcin-containing formaldehyde condensate | — | 2.2 |
| Hexamethoxymethylmelamine | 0.8 | 0.8 |
| DZ | 0.3 | — |
| NS | 0.3 | 0.6 |
| Sulfur | 4 | 4 |

As against the tire according to Comparative Example 9 that includes a tread produced from a composition (I) and a rear pad rubber produced from a composition (II) with mix proportion A containing resorcin, in a tire according to Comparative Example 10 that includes the same tread and a rear pad rubber produced from a composition (II) with mix proportion B containing a resorcin-containing formaldehyde condensate, the tire durability was improved; however, the rolling resistance was not much decreased. In a tire according to Comparative Example 11 that includes a tread produced from a composition (I) containing silica and a rear pad rubber produced from a composition (II) with mix proportion A, the rolling resistance was decreased as compared with the tire according to Comparative Example 10; however, the durability was reduced. Meanwhile, as against the tires according to Comparative Examples 9 to 11, in tires according to Examples 13 to 16 that include a tread produced from a composition (I) containing silica and a rear pad produced from a composition (II) with mix proportion B containing a resorcin-containing formaldehyde condensate, the rolling resistance was significantly reduced, and the tire durability was significantly improved.

What is claimed is:

1. A pneumatic tire comprising:
a tread part;
a pair of side wall parts that extend radially inwardly from widthwise ends of the tread part;
a pair of bead parts located at respective radially inner ends of the pair of side wall parts, each bead part comprising a bead core and a bead filler that is connected to the bead core and extends to an outer-diameter-side in a tire radial direction;
a carcass ply that is suspended between the bead cores;
a side wall rubber in each side wall part that is arranged on a tire-outer-surface-side of the carcass ply and constitutes a tire outer surface;
a chafer layer in each side wall part that is arranged adjacent to the outer surface side of the carcass ply and is turned from a tire-inner-surface-side to the tire-outer-surface-side around the bead core and the bead filler and rolled up to the outer-diameter-side in the tire radial direction together with the carcass ply;
a pair of support rubbers in each side wall part that are located between the side wall rubber and the carcass ply and arranged so as to hold a tire-outer-surface-side rolled-up end of the chafer layer from both sides in a tire width direction; the pair of support rubbers in each side wall part include: a pad rubber adjacent to the tire-outer-surface-side of the rolled-up end of the chafer layer; and a tape rubber adjacent to the tire-inner-surface-side of the rolled-up end of the chafer layer; and
a tread rubber forming the tread part,
wherein in each side wall part the 100% modulus values of the pair of support rubbers are higher than the 100% modulus value of the side wall rubber,
in each side wall part a height position of an inner-diameter-side end of the tape rubber in the tire radial direction is located on the tire-inner-diameter-side further than the inner-diameter-side end of the rear pad rubber and in a range of −6% or more but not exceeding 2% of a tire reference cross-section height to an outer-diameter-side end surface of the bead core, and
the tread rubber contains silica.

2. The pneumatic tire according to claim 1, wherein a position of an outer-diameter-end of the pad rubber in the tire radial direction is different from a position of an outer-diameter-end of the tape rubber.

3. The pneumatic tire according to claim 1, wherein the rolled-up end of the chafer layer is located in a radial range from a position of 3% of the tire reference cross-section height to an inside in the tire radial direction to a position of 5% of the tire reference cross-section height to an outside in the tire radial direction with reference to outer-diameter-side ends of the bead cores.

4. The pneumatic tire according to claim 1, wherein the rolled-up end of the chafer layer has an overlap with the pair of support rubbers over a length of five millimeters or more in the tire radial direction.

5. The pneumatic tire according to claim 1, wherein the pad rubber is arranged in a radial range of 15% or more but not exceeding 45% of the tire reference cross-section height in the tire radial direction.

6. The pneumatic tire according to claim 1, wherein a height position of an outer-diameter-side end of the tape rubber is located in a range of 10% or more but not exceeding 15% of the tire reference cross-section height to the outer-diameter-side end surface of the bead core.

7. A pneumatic tire comprising:
a tread part;
a pair of side wall parts that extend radially inwardly from widthwise ends of the tread part;
a pair of bead parts located at respective radially inner ends of the pair of side wall parts, each bead part comprising a bead core and a bead filler that is connected to the bead core and extends to an outer-diameter-side in a tire radial direction;
a carcass ply that is suspended between the bead cores;
a side wall rubber in each side wall part that is arranged on a tire-outer-surface-side of the carcass ply and constitutes a tire outer surface;
a chafer layer in each side wall part that is arranged adjacent to the outer surface side of the carcass ply and is turned from a tire-inner-surface-side to the tire-outer-surface-side around the bead core and the bead filler and rolled up to the outer-diameter-side in the tire radial direction together with the carcass ply;
a pair of support rubbers in the form of a tape rubber and a rear pad rubber in each side wall part that are located between the side wall rubber and the carcass ply and arranged so as to hold a tire-outer-surface-side rolled-up end of the chafer layer from both sides in a tire width direction; and
a tread rubber forming the tread part,
wherein in each side wall part the 100% modulus values of the pair of support rubbers are higher than the 100% modulus value of the side wall rubber,
in each side wall part a height position of an inner-diameter-side end of the tape rubber in the tire radial direction is located on the tire-inner-diameter-side further than the inner-diameter-side end of the rear pad rubber and in a range of −6% or more but not exceeding 2% of a tire reference cross-section height to an outer-diameter-side end surface of the bead core,
the tread rubber contains silica, and
in each side wall part the rear pad rubber contains a Resorcin-containing formaldehyde condensate,
wherein the pair of support rubbers include:
the rear pad rubber adjacent to the tire-outer-surface-side of the rolled-up end of the chafer layer; and
the tape rubber adjacent to the tire-inner-surface-side of the rolled-up end of the chafer layer.

8. The pneumatic tire according to claim 7, wherein a position of an outer-diameter-end of the rear pad rubber in the tire radial direction is different from a position of an outer-diameter-end of the tape rubber.

9. The pneumatic tire according to claim 7, wherein the rolled-up end of the chafer layer is located in a radial range from a position of 3% of the tire reference cross-section height to an inside in the tire radial direction to a position of 5% of the tire reference cross-section height to an outside in the tire radial direction with reference to outer-diameter-side ends of the bead cores.

10. The pneumatic tire according to claim 7, wherein the rolled-up end of the chafer layer has an overlap with the pair of support rubbers over a length of five millimeters or more in the tire radial direction.

11. The pneumatic tire according to claim 7, wherein a height position of an outer-diameter-side end of the tape rubber is located in a range of 10% or more but not exceeding 15% of the tire reference cross-section height to the outer-diameter-side end surface of the bead core.

* * * * *